United States Patent
Borck et al.

(10) Patent No.: US 10,522,807 B2
(45) Date of Patent: Dec. 31, 2019

(54) RECHARGEABLE ELECTROCHEMICAL CELL AND METHOD FOR PRODUCTION THEREOF

(75) Inventors: Markus Borck, Stuttgart (DE); Laurent Zinck, Mothern (FR)

(73) Assignee: INNOLITH ASSTE AG, Basel (CH)

( * ) Notice: Subject to any disclaimer, the term of this patent is extended or adjusted under 35 U.S.C. 154(b) by 274 days.

(21) Appl. No.: 14/238,108

(22) PCT Filed: Aug. 10, 2012

(86) PCT No.: PCT/EP2012/065727
§ 371 (c)(1),
(2), (4) Date: Aug. 19, 2014

(87) PCT Pub. No.: WO2013/024045
PCT Pub. Date: Feb. 21, 2013

(65) Prior Publication Data
US 2015/0004463 A1    Jan. 1, 2015

Related U.S. Application Data

(63) Continuation of application No. 13/209,357, filed on Aug. 12, 2011, now abandoned.

(51) Int. Cl.
*H01M 2/16* (2006.01)
*H01M 2/18* (2006.01)
(Continued)

(52) U.S. Cl.
CPC ......... *H01M 2/1613* (2013.01); *H01M 2/145* (2013.01); *H01M 2/18* (2013.01);
(Continued)

(58) Field of Classification Search
CPC ............. H01M 2/1613; H01M 2/1653; H01M 2/0275; H01M 2/18; H01M 2/1673;
(Continued)

(56) References Cited

U.S. PATENT DOCUMENTS 4,063,978 A * 12/1977 Badger .................. H01M 2/18
                                                                 156/213
4,778,479 A    10/1988 Römling et al.
(Continued)

FOREIGN PATENT DOCUMENTS

EP      0 240 915 A1    10/1987
EP      0 269 855 A2     6/1988
(Continued)

OTHER PUBLICATIONS

Stassen, I. and Hambitzer, G. "Metallic lithium batteries for high power applications", Journal of Power Sources, vol. 105, pp. 145-150, published Nov. 5, 2001.*

(Continued)

*Primary Examiner* — Miriam Stagg
*Assistant Examiner* — Lilia Nedialkova
(74) *Attorney, Agent, or Firm* — Bose McKinney & Evans LLP

(57) ABSTRACT

Rechargeable electrochemical battery cell having a housing (1), a positive electrode (11), a negative electrode (10) and an electrolyte (9) which contains $SO_2$ and a conducting salt of the active metal of the cell, wherein at least one of the electrodes (11) is enveloped by a sheath (13) made from a glass fiber textile material, the areal extent of the sheath (13) made from glass fiber textile material being greater than the surface area of the electrode (11), so that the glass fiber textile material extends beyond the limit (14) of the electrode, the electrode, and two layers (15, 16) of the glass fiber textile material which cover the electrode (11) on both sides are connected to one another at the edge of the electrode (11) by an edge connection (17).

48 Claims, 3 Drawing Sheets

Figure 1:
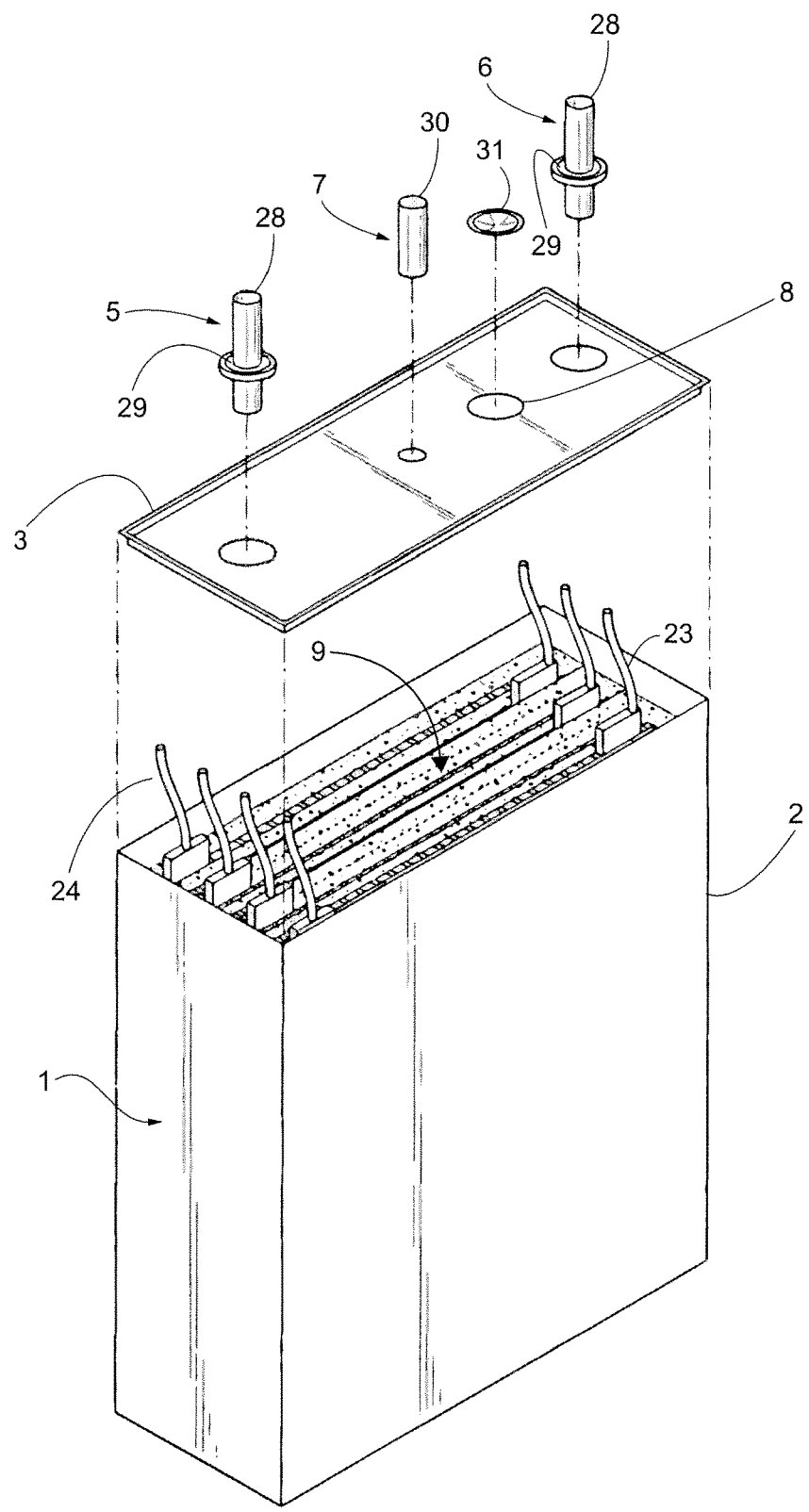

(51) Int. Cl.
*H01M 4/58* (2010.01)
*H01M 10/0525* (2010.01)
*H01M 2/14* (2006.01)
*H01M 4/485* (2010.01)
*H01M 2/08* (2006.01)
*H01M 4/136* (2010.01)
*H01M 2/02* (2006.01)
*H01M 10/0563* (2010.01)
*H01M 4/80* (2006.01)

(52) U.S. Cl.
CPC ......... *H01M 4/485* (2013.01); *H01M 4/5825* (2013.01); *H01M 10/0525* (2013.01); *H01M 10/0563* (2013.01); *H01M 2/0275* (2013.01); *H01M 2/08* (2013.01); *H01M 4/136* (2013.01); *H01M 4/808* (2013.01); *H01M 2300/002* (2013.01); *Y10T 156/10* (2015.01)

(58) Field of Classification Search
CPC ............ H01M 4/808; H01M 10/0563; H01M 10/0525; H01M 2300/002; H01M 2/08; H01M 2/145; H01M 4/136; H01M 4/485; H01M 4/5825; Y10T 156/10
See application file for complete search history.

(56) References Cited

U.S. PATENT DOCUMENTS

| | | | |
|---|---|---|---|
| 5,470,675 A | 11/1995 | Einerhand et al. | |
| 5,470,676 A | 11/1995 | Nakano | |
| 6,280,878 B1 * | 8/2001 | Maruyama | H01M 4/13 429/231.1 |
| 6,511,773 B1 | 1/2003 | Dampier | |
| 6,887,620 B2 | 5/2005 | Klein et al. | |
| 7,951,480 B1 * | 5/2011 | Skinlo | H01M 2/1673 29/623.1 |
| 2003/0165736 A1 | 9/2003 | Hiratsuka | |
| 2005/0031942 A1 * | 2/2005 | Hennige | H01M 2/1613 429/144 |
| 2008/0199781 A1 * | 8/2008 | Lunt | H01M 2/1646 429/246 |
| 2009/0136834 A1 * | 5/2009 | Coowar | H01M 2/0267 429/127 |
| 2010/0062341 A1 | 3/2010 | Hambitzer | |
| 2010/0283429 A1 | 11/2010 | Ofer et al. | |
| 2011/0076544 A1 * | 3/2011 | Maeda | H01M 2/18 429/136 |
| 2011/0189536 A1 | 8/2011 | Moon et al. | |

FOREIGN PATENT DOCUMENTS

| | | |
|---|---|---|
| EP | 0 472 232 A2 | 2/1992 |
| EP | 1 923 934 A1 | 5/2008 |
| EP | 2 355 203 A1 | 8/2011 |
| JP | S 61-183867 A | 8/1986 |
| JP | S 62-237679 A | 10/1987 |
| JP | S 63-143759 A | 6/1988 |
| JP | H 07-34555 U | 6/1995 |
| JP | H 10-188938 A | 7/1998 |
| JP | 2011071134 A | 4/2011 |
| WO | WO 03/021697 | 3/2003 |
| WO | WO 2008/058685 A1 | 5/2008 |
| WO | WO 2008/147751 A1 | 12/2008 |
| WO | WO 2011/098233 A2 | 8/2011 |

OTHER PUBLICATIONS

English Translation of the International Preliminary Report on Patentability; PCT/EP2012/065727; dated Feb. 27, 2014.

Foster et al., Newly High Conductive Inorganic Electrolytes, Electrochemical Science and Technology, Nov. 1988. vol. 135, No. 11. pp. 2682-2686.

* cited by examiner

RECHARGEABLE ELECTROCHEMICAL CELL AND METHOD FOR PRODUCTION THEREOF

The invention relates to a rechargeable lithium battery cell with a positive electrode, a negative electrode and an electrolyte that contains a conducting salt.

Rechargeable battery cells are of great importance in many technical fields. They are often used for applications in which only relatively small current levels are required, such as mobile phones. There is also a great demand for battery cells for high current applications (high-current cells), where the electric propulsion of vehicles is of particular importance. The present invention is directed in particular to cells that are also suitable for high current applications.

An important requirement is a high energy density. The cell is intended to contain as much electrical energy per unit weight and unit volume as possible. In this respect, lithium is particularly advantageous as an active metal.

Rechargeable lithium cells are in practice almost exclusively lithium-ion cells. Their negative electrode consists of copper-coated carbon, in which lithium-ions are stored during charging. The positive electrode also consists of an insertion material that is suitable for absorbing ions of the active metal. Normally the positive electrode is based on lithium-cobalt oxide which is coated onto an aluminum conducting element. Both electrodes are very thin (thickness typically less than 100 µm). During charging, the ions of the active metal are discharged from the positive electrode and inserted into the negative electrode. During discharging the reverse process occurs. The ions are transported between the electrodes by means of the electrolyte, which has the required ion mobility. Lithium-ion cells contain an electrolyte consisting of a lithium salt (e.g. $LiPF_6$) dissolved in an organic solvent or a solvent mixture (e.g. based on ethylene carbonate). They are also designated hereafter as "organic lithium-ion cells".

Organic lithium-ion cells are problematic with regard to safety. Safety risks are caused in particular by the organic electrolyte. If a lithium-ion cell catches fire or even explodes, the organic solvent of the electrolyte forms the combustible material. In order to avoid such hazards, additional measures must be taken, in particular with regard to a very precise regulation of the charging and discharging processes and with regard to additional safety measures in the battery design. For example, the cell contains components that melt in the event of a fault and therefore prevent the flow of current in the cell. However, these measures lead to increased costs and increased volume and weight, thus reducing the energy density.

The problems are particularly serious when battery cells are to be developed for high current applications. The requirements on the stability and long-term operational safety are particularly high. Cells which are designated as high-current cells here are those which (at the rated voltage) have a current carrying capacity, in relation to the electrode surface area (hereinafter referred to as "area-specific current carrying capacity"), of at least 5 mA/cm², preferably at least 10 mA/cm², more preferably at least 50 mA/cm², and particularly preferably at least 100 mA/cm².

There is a high demand for improved rechargeable battery cells, which in particular meet the following requirements:

Very good electrical performance figures, in particular high energy density combined with high current draw values (power density).

Safety, even under the more challenging operating conditions in a vehicle.

Long service life, in particular a high number of usable charge and discharge cycles.

Minimal cost, i.e. cost-effective materials and maximally simple production methods.

Further important practical requirements, such as overload capability and deep discharge capability.

In WO 2011/098233 A2 a battery cell is described that satisfies these partially conflicting demands in a substantially better manner than has been the case up to now. It is characterized by the following special features, which are also preferably implemented in the battery cell of the present invention:

a) The electrolyte contains $SO_2$. Preferably this is a $SO_2$ based electrolyte. This is the term used in the context of the invention to designate an electrolyte which contains $SO_2$ not merely as an additive at a low concentration, but in which the concentration of the $SO_2$ is so high that the mobility of the ions in the conducting salt, which is contained in the electrolyte and causes the charge transport, is at least in part guaranteed by the $SO_2$. The electrolyte is preferably substantially free of organic materials, where "substantially" is to be understood in the sense that the quantity of any organic materials that may be present is so low that they do not present a safety hazard.

b) the positive electrode contains an active material having the composition $Li_xM'_yM''_z(XO_4)_aF_b$, wherein M' is at least one metal selected from the group consisting of the elements Ti, V, Cr, Mn, Fe, Co, Ni, Cu and Zn, M" is at least one metal selected from the group consisting of the metals of groups 2, 3, 4, 5, 6, 8, 9, 10, 11, 12, 13, 14, 15 and 16 of the periodic table, X is selected from the group consisting of the elements P, Si and S, x is greater than 0, y is greater than 0, z is greater than or equal to 0, a is greater than 0 and b is greater than or equal to 0.

The element X here is preferably P. Particularly preferably M' is the metal Fe and particularly preferably b is equal to 0. Lithium-iron phosphates are particularly preferred active materials of the positive electrode.

Particularly preferred active materials of the positive electrode are:

$LiFePO_4$ $Li_xFe_yM_zPO_4$ $Li_xFe_y(SO4)_a$ $LiFeSO_4F$, where the suffixes x, y, z and a have the above interpretation.

The active material may contain an additional doping, which is not a component part of its atomic structure.

On the basis of this prior art the invention aims to create a cell with improved functioning and operational safety.

This technical problem is solved by a rechargeable electrochemical battery cell comprising a housing, a positive electrode, a negative electrode and an electrolyte that contains $SO_2$ and a conducting salt of the active metal of the cell, which is characterized in that at least one of the electrodes is enveloped by a sheath made from a glass fiber textile material, the areal extent of the sheath made from glass fiber textile material is greater than the areal extent of the electrode, so that the glass fiber textile material extends beyond the limit of the electrode, and two layers of the glass fiber textile material which cover the electrode on both sides are connected to one another at the edge of the electrode by an edge connection. The subject matter of the invention also includes a method for producing such a battery cell.

The combination of the features according to the invention enables a significant improvement in the functioning of the cells to be obtained. In particular, it has been found in the context of the invention that the sheathing of the electrode leads to a more uniform ion migration and ion distribution. The more uniform the ion distribution, in particular in the negative electrode, the higher the possible charging of the active material of the electrode and, as a consequence, the usable capacity of the cell. At the same time, this prevents the hazards that can be associated with a non-uniform charging and the resulting deposition of the active metal. These advantages are most effective when the positive electrodes of the cell are enveloped with the sheath made of glass fiber textile material (hereafter also designated as "glass fiber pouch"). This means the effect is different with regard to the electrode polarity, even if the electrode design is completely symmetrical, apart from the active material of the electrode.

An integral component of each electrode is an active material, the charge state of which changes when ions of the active metal surface of the cell, in particular lithium ions, are absorbed into the active material during charging or discharging of the cell. Electrons released by this process are transported into an electronically conductive conducting element, which is also part of the electrode.

As already mentioned, the present invention is preferably used in a rechargeable lithium battery cell in accordance with WO 2011/098233 A2. Reference is made to the content of this document in full. For example, the present invention incorporates the following special features that are substantially described in the document cited, from which further details can also be obtained:

The positive electrode is unusually thick, minimum thicknesses of 0.25 mm, 0.3 mm, 0.4 mm, 0.5 mm, 0.6 mm, 0.8 mm and 1.0 mm being particularly preferred, in this order. Preferably, the maximum thickness of the positive electrode is 2 mm, particularly preferably a maximum of 1.5 mm.

The positive electrode has a conducting element with a three-dimensional porous metal structure, in particular in the form of a metal foam. It is particularly preferred if this porous metal structure extends substantially over the entire thickness of the positive electrode. In accordance with a further preferred embodiment the active material of the positive electrode is substantially uniformly distributed in the three-dimensional porous metal structure that forms the conducting element of said electrode.

The negative electrode preferably contains carbon as the active material for absorbing lithium ions. It is also preferably unusually thick, minimum thicknesses of 0.2 mm, 0.3 mm, 0.4 mm, 0.5 mm, 0.6 mm and 0.8 mm being particularly preferred, in this order. The thickness of the negative electrode is preferably a maximum of 1.5 mm, particularly preferably a maximum of 1 mm.

The electrolyte contains a relatively high concentration of $SO_2$ in comparison to the amount of conducting salt, with minimum values of 1.5 mol $SO_2$, 2 mol $SO_2$, 2.5 mol $SO_2$, 3 mol $SO_2$, 4 mol $SO_2$, 4.5 mol $SO_2$, 5 mol $SO_2$ and 6 mol $SO_2$ per mol conducting salt being particularly preferred in this order. Preferably, the maximum concentration is 20 mol $SO_2$ per mol conducting salt.

The solution to the problem addressed by the invention was faced with a number of difficult issues related to the use of an inorganic, preferably $SO_2$-based, electrolyte and which are not present in the case of conventional cells with an organic electrolyte.

The electrolyte is very aggressive. Both the glass fiber textile material and the edge connection must be stable against the $SO_2$ electrolyte and its overcharging products. This severely restricts the selection of suitable materials.

The term glass fiber textile material designates composite structures made of very thin threads or fibers, in particular woven, knitted and non-woven fabrics. The textile structure is associated with significant processing related problems in the production of an electrochemical cell.

The textile structure and the smooth surface of the glass fibers result in severe fraying at the edge of the glass fiber layers. This impedes their functioning and makes assembly difficult.

The glass fiber materials that can be used for electrochemical cells are composed of very thin fibers. In order to optimize the charging capacity of the cell and its electrochemical properties, the glass fiber textile material should be as thin as possible. In the practical testing of the invention, for example, a material with an overall thickness of 120 µm was used. This leads to the material being very flexible (bendable). It therefore has virtually no natural stiffness, which would simplify the assembly. It is only once the connection is made at the edge that a mechanical strength is obtained that is advantageous for the assembly and mechanical stability of the cell.

As already mentioned, the invention is preferably used in conjunction with relatively thick positive electrodes. In order to maximize the discharge capacity of the cell, the margin by which the glass fiber pouch extends beyond the outer dimensions of the electrode should be as narrow as possible. This places considerable demands on the ductility of the material in the edge region and on the mechanical strength of the edge connection.

In the context of the invention it has been found that, in spite of these concerns, the sheathing of the electrodes, in particular of the positive electrodes, with a glass fiber pouch is not only possible, but also particularly advantageous, with the advantages resulting in particular from the improved uniformity of the ion migration, as explained above.

Further advantages are obtained, taking into account the preferred embodiments explained hereafter.

Figure 2:
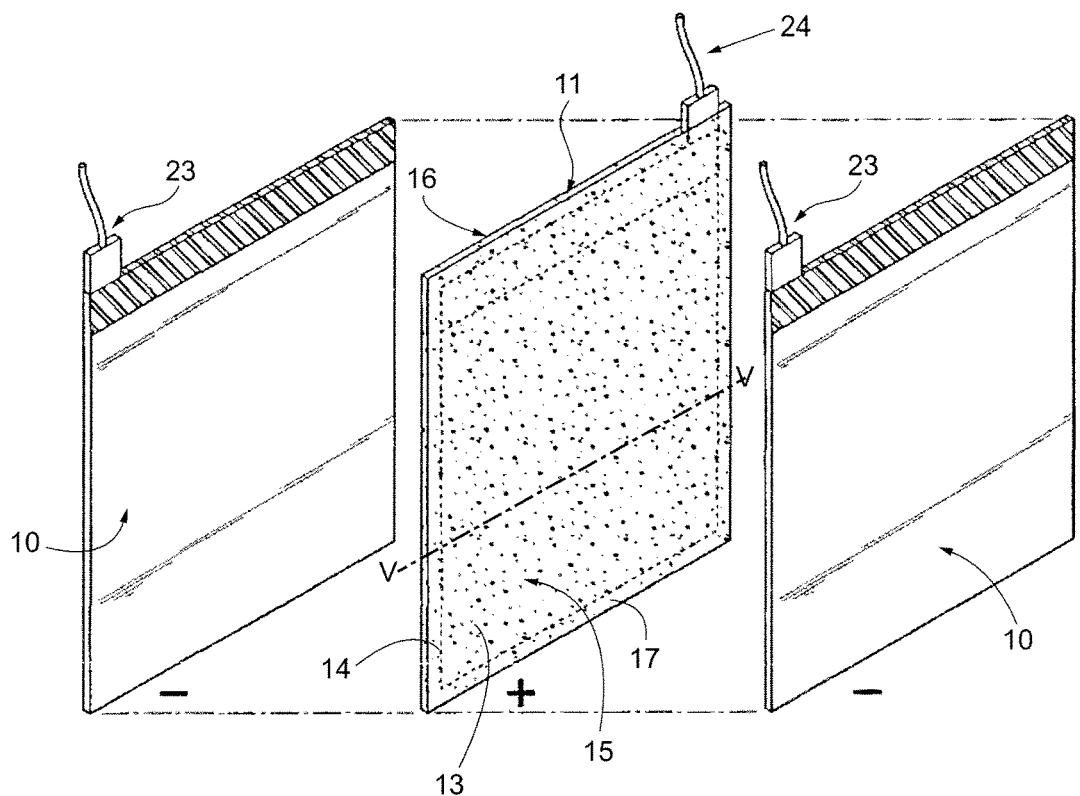
Figure 3:
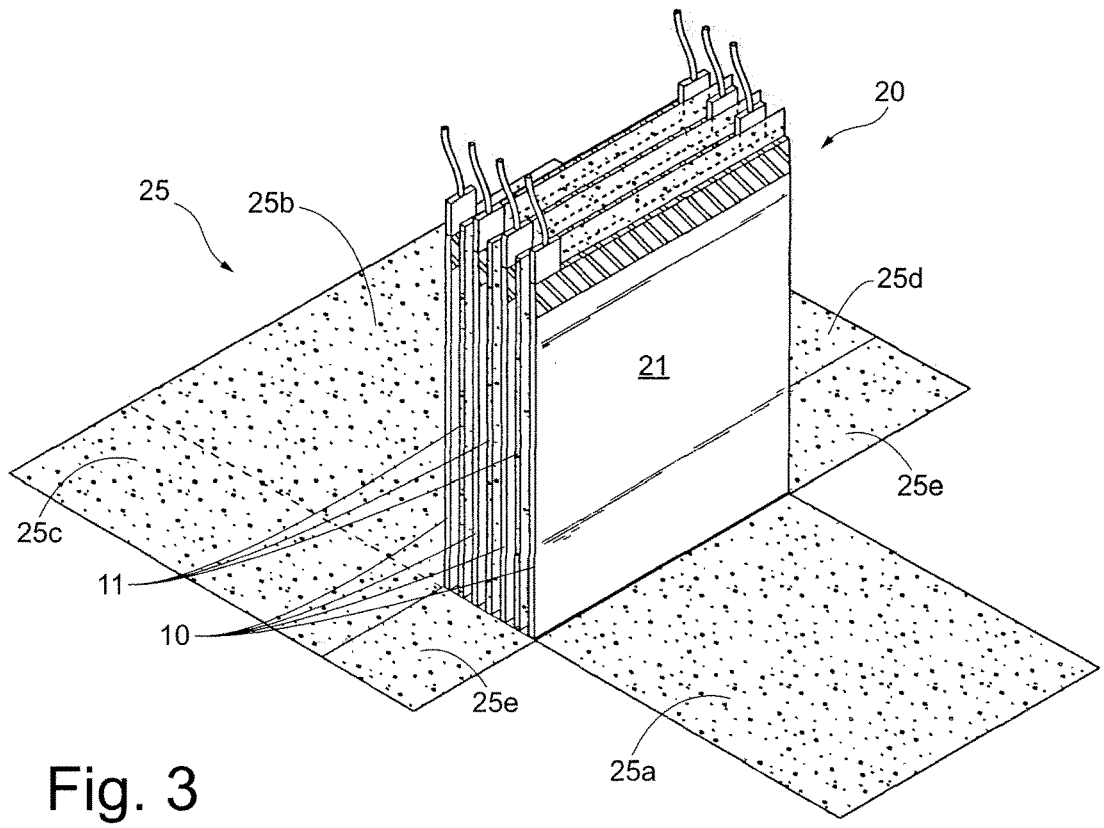
Figure 4:
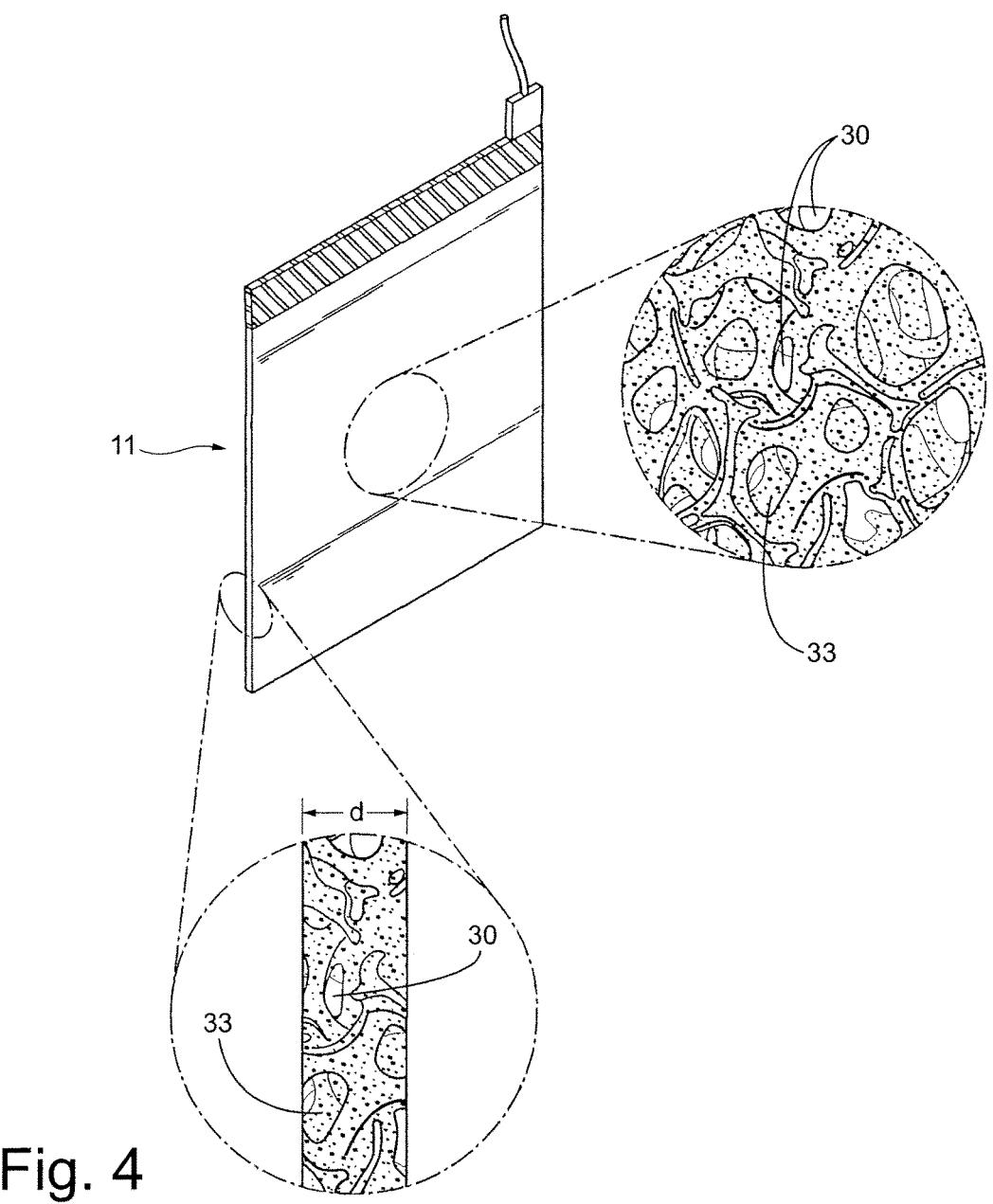
Figure 5:
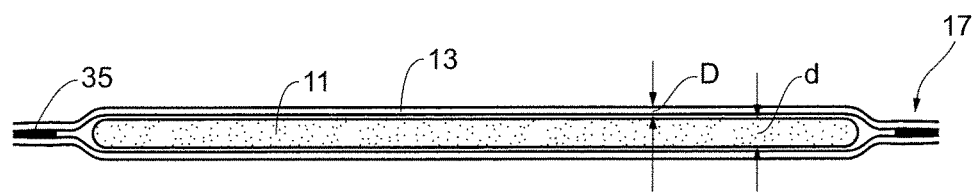

The invention is explained hereafter in more detail by means of an exemplary embodiment shown in the figures. The special features shown there and described hereafter can be used singly or in combination to produce preferred forms of the invention. In the figures:

FIG. 1 a perspective exploded view of the battery cell according to the invention;

FIG. 2 a perspective illustration of one positive and two negative electrodes of an electrode stack in the cell of FIG. 1;

FIG. 3 a perspective illustration of an electrode stack of the cell of FIG. 1 and a stack sheath of the electrode stack that has not yet been folded;

FIG. 4 a perspective view of a positive electrode with schematic enlarged excerpts to describe its inner structure;

FIG. 5 a cross section through a positive electrode enveloped with a sheath along the line V-V in FIG. 2;

FIG. 1 shows an electrochemical cell according to the invention with a housing 1 which comprises a lower part 2 open only at the top and a cover part 3 closing the upper opening of the lower part 2. In the preferred case shown, the housing is implemented in the form of a prism (cuboidal). Another housing design is, however, also possible, in particular one that is cylindrically shaped with preferably coiled electrodes. The housing wall preferably consists of a durable metal, such as stainless steel, which is corrosion resistant to the electrolyte of the cell and against possible overcharging products. For many applications, in particular in automotive engineering, the housing should have a service life of more than ten years.

In the preferred case shown, the cover part 3 has four ports, namely two electrical feed-throughs 5 and 6, a filling port 7 and a safety port 8. The electrical feed-throughs 5 and 6 each have one conductor rod 28 which is seated in an insulation ring 29, which serves to seal off the electrical feed-through and ensure the required electrical insulation from the cover part 3. The electrical feed-throughs 5 and 6 are connected in an electrically conductive manner to the terminal wires 23 and 24 of the positive and the negative electrodes respectively.

Preferably, the electrical feed-throughs are implemented as glass-to-metal feed-throughs, and the insulation ring 29 is composed of a glass material which is connected in a sealed manner, for example by laser welding, to the cover part 3 and to the conductor rod 28. The conductor rod 28 extends into the interior of the housing. It can be of solid construction and be used for the electrical connection of the cell. The terminal wires 23, 24 can be welded to the lower end of the conductor rod 28 in the interior of the cell. The terminal wires 23, 24 can also be implemented in the form of metal plates.

Also possible are embodiments in which at least one of the conductor rods 28 has a channel in its interior, which is used as the outlet opening between the interior and the exterior of the cell. The terminal wires can be fed through the channels of the conductor rods 28. The openings 5, 6 are then closed with a gas-tight seal, for example, welded, so that the cell is permanently sealed with a gas-tight seal. The electrodes are connected in parallel. For the sake of clarity the electrical connections necessary for this purpose are not shown in the figure.

In the embodiment shown, the filling port 7 has a connecting pipe 30 with an passage channel that ensures the required connection between the interior and the exterior of the cell to fill the cell with the electrolyte. The passage channel is closed off, for example by welding, after filling with appropriate media, so that the cell is permanently gas-tight.

The safety port 8 preferably has a surface layer which is implemented such that it bursts open or gives way if the internal pressure in the cell exceeds a predetermined value. The surface layer of a disk 31 which is designed to rupture (bursting disk) is preferably formed of metal. In the operating state of the cell the housing is preferably hermetically sealed. Further, it is preferable that one or more of the elements shown (glass-to-metal feed-through, electrolyte filling port and bursting disc) are joined to the corresponding ports on the cover part 3 by laser welding. A laser welding method is preferably also used for connecting the cover part 3 to the lower part 2 of the housing 1.

In FIG. In FIG. 2 two negative electrodes 10 and one positive electrode 11 are shown. Each of the electrodes has a terminal wire 23 and 24, respectively, for connecting to the corresponding electrical (gas-tight sealed) feed-throughs 5 and 6 of the cell respectively. Metal plates or the like can of course also be used. The electrodes are implemented in the form of flat plates, i.e. they have very low thickness compared to their areal dimensions (length and width). The dimensions in the areal direction (length and width of the surface area) are together designated as "areal extent".

In the preferred embodiment shown, the positive electrode (preferably all positive electrodes of the cell) is enveloped by a sheath 13 made of a glass fiber textile material (glass fiber pouch). The areal extent of the sheath is greater than the areal extent of the electrode, the boundary 14 of which is drawn in FIG. 2 as a dashed line. Two layers 15 and 16 of the glass fiber textile material, which cover the electrode on both sides, are connected to one another at the edge of the electrode 11 with an edge connection 17. The edge connection 17 preferably extends along at least two, more preferably three, of the four edges of the glass fiber pouch 13 or of the electrode 11 positioned therein, namely the bottom edge and the side edges extending upwards. The edge connection is preferably continuous at the edges where it is present. Depending on the type of application however, they can also be discontinuous. In cells (such as the cells of car batteries) which are used in a particular orientation in space, and which therefore do not have to function independently of their orientation, the edge connection at the upper edge can be omitted. The glass fiber pouches, which are open on one side, already ensure a reliable retention of the sheathed electrode on account of the tight packing of the electrodes in the cell and expansion occurring during the operation of the battery, so that the electrodes are prevented from slipping or falling out. Nevertheless, even in these types of application and, in particular, in the case of cells that are operated independently of their orientation, an edge connection on all edges of the sheath is advantageous. It has in this case preferably only one interruption, sufficient to allow the passage of the terminal wires.

Different textile fiber composite structures are suitable for the glass fiber textile material. Important examples are woven fabrics, non-woven fabrics and knitted fabrics made of glass fibers. The textile fiber composite structure can consist of both single-filament glass threads and multi-filament glass threads (glass fiber yarns). Fabrics made of multi-filament glass fiber yarns are particularly preferred.

Detailed specifications of the parameters of particularly preferred glass fiber textile materials cannot be given, because a complex interrelationship exists among the different parameters of the glass fiber textile material (e.g. thread density, thread size, mono- or multi-filament, total thickness of the coating material). On the basis of the teachings of the present invention, however, it is possible without further effort to test the suitability of a particular glass fiber textile material under consideration.

In doing so, it may be expedient to first test the following properties of a proposed glass fiber textile material in preliminary tests outside of the cell:
Wettability with electrolyte
Resistance to the $SO_2$-based electrolyte
Resistance to the overcharging products, in particular to aluminum chloride and sulfuryl chloride
Mechanical stability after electrolyte contact
Electrical short-circuit test
Mechanical stability during assembly (handling, cutting, stacking, inserting into the cell etc.)
Good adhesion for producing the edge connection The tests selected must be those which take into account the future usage of the material. For example, a material does not need to be stable against overcharging products if it is used in a cell in the operation of which no overcharging products are formed. Materials that are intended to serve as a stack sheath must not necessarily be wettable with electrolyte.

Materials that have proven useful in these preliminary tests can then be built into a test cell. Their properties are examined, in particular as regards electrical capacity over a plurality of charging and discharging cycles, and as regards safety even under extreme operating conditions (rapid charging and/or overcharging).

According to the present knowledge of the inventors, the thickness of the glass fiber textile material be a maximum of 300 µm, preferably no more than 200 µm, and particularly preferably no more than 150 µm. The further improvement of the electrical cell properties achievable with thicker materials does not as a rule justify the loss of energy density that is associated with the additional material.

On the other hand, the thickness of the glass fiber textile material should not fall below some minimum values either, because in the context of the invention it has been found that the improvements to electrical data of the cell which are sought are not then achieved to the desired extent. The thickness of the glass fiber textile material is preferably at least 50 µm, with values of 60, 70, 80 and 90 µm in this order being particularly preferred.

The thread density (TPI) is also important for success in practice. For the preferred case of a glass fiber fabric, the thread density can be different in the two spatial directions corresponding to the warp and weft of the fabric. In the direction having the lower density it should preferably be at least five threads/cm, preferably at least 10 threads/cm, more preferably at least 20 threads/cm.

The multi-filament glass fiber yarns (also designated as glass filament yarns) used for the production of glass fiber textile materials are often coated with a so-called "size", which facilitates further processing, such as the weaving of a fabric. The size can consist of starch and oils.

It has been found that completely free, hence uncoated, glass fiber surfaces do not necessarily offer an advantage. Particularly good results have been obtained with glass fiber textile materials in which the glass fibers are provided with a suitable polymer coating. The coating preferably contains either a fluorine-containing polymer such as PTFE (polytetrafluoroethylene), ETFE (ethylene tetrafluoroethylene), FEP (perfluoroethylene propylene), THV (terpolymers made of tetrafluoroethylene, hexafluoropropylene and vinylidene fluoride) or PFA (perfluoroalkoxy polymers), or it contains an amino-silane or PP (polypropylene) or PE (polyethylene). A coating of such a type can improve the mechanical stability of the glass fiber textile material. In addition, an additional benefit in the safety of the cell can be obtained. In the case of fluorinated polymers this can be explained by the fact that if metallic lithium precipitation occurs, the lithium reacts with the fluorine of the coating, forming lithium fluoride (LiF). This reaction can prevent short circuits. If a greater precipitation of lithium were to occur, due to the reaction with the fluorinated coating the glass fiber textile material can become so dense that no further reactions can take place and the ionic transport is blocked by the textile material. This prevents or stops strong short-circuit reactions. In the practical testing of the invention it was also found that when the coated glass fiber textile materials were used, an improved stability of the electrical capacity could be obtained over a plurality of charging and discharging cycles.

FIG. 3 shows an electrode stack consisting of four negative electrodes 10 and three positive electrodes 11, the positive electrodes 11 each being enveloped with a glass fiber pouch 13. The electrodes 10, 11 are arranged alternately in the electrode stack 20. Generally speaking, it is preferred when the number of the non-sheathed electrodes (preferably the negative electrodes) is greater by one than the number of the electrodes with a glass fiber pouch (preferably the positive electrodes). This has the consequence that the outer end faces 21 of the electrode stack 20 are formed by the non-sheathed electrode surfaces (preferably of the negative electrodes).

As mentioned above, the housing 1 of the cell preferably consists of a metal or other electrically conducting material. It has proved to be advantageous to envelope the electrode stack 20 with an outer sheath designated as stack sheath 25, in such a manner that no electrical contact exists with the walls of the housing 1. In FIG. 3 this stack sheath 25 is shown in a condition before it is folded around the electrode stack 20. The partial surface 25a of the stack sheath 25 is folded over the negative electrode 10 at one end of the electrode stack 20, the partial surface 25b is folded over the negative electrode 10 at the other end of the electrode stack 20. The partial surfaces 25c and 25d are folded over the side faces of the electrode stack 20 formed by the edges of the electrodes 10 and 11. Finally, the partial surfaces 25e are folded over the base area of the electrode stack 20 formed by the lower edges of the electrodes 10 and 11.

Suitable materials for the stack sheath are the glass fiber textile materials described above. But there are other suitable insulating materials, because the requirements are lower than in the case of the glass fiber pouches. Other materials which can be used for the stack sheath are polymer films made of e.g. PP (polypropylene) or PE (polyethylene), and in particular, films made of fluorine-containing polymers such as PTFE (polytetrafluoroethylene), ETFE (ethylene tetrafluoroethylene), FEP (perfluorethylenpropylene), THV (terpolymers made of tetrafluoroethylene, hexafluoropropylene and vinylidene fluoride) or PFA (perfluoroalkoxy polymers).

The dimensions of the electrode stack 20 and the housing 1 are matched to each other such that the electrode stack 20 can be inserted into the housing 1, as shown in FIG. 1. The clearance between the boundary of the electrode stack 20 (fitted with the stack sheath 25) and the inner walls of the housing should be as small as possible, in order to maximize the energy density of the cell and to prevent unwanted movements of the electrodes in the housing.

The housing 1 containing the electrodes 10, 11 is filled with an electrolyte 9 via the filling port 7 (FIG. 1). The quantity of fluid is preferably calculated in such a manner that the surface of the electrolyte extends in a plane below the upper boundary of the glass fiber pouch 13. In general, the design should be such that a transport of ions between the negative electrodes 10 and the positive electrodes 12 is possible only through the glass fiber textile material of the sheaths 13.

FIG. 4 shows, by means of two schematic enlarged excerpts, the internal structure of a preferred positive electrode. It has a conducting element 30 with a three-dimensional porous metal structure. The conducting element is preferably formed by a metal foam, wherein it is particularly advantageous if the porous metal structure extends substantially over the entire thickness d of the positive electrode.

The active material 33 of the positive electrode, for example lithium-iron phosphate, is located in the pores of the porous metal structure and is preferably distributed homogeneously therein. Further details can be obtained from the above-mentioned document WO 2011/098233 A2. In the context of the invention particularly advantageous results have been found to be obtained with the combination of the electrode types described there and a glass fiber pouch as described here.

The electrodes described in document WO 2011/098233 A2 are unusually thick. Because of this thickness, and in addition due to the sharp edges of the porous metal structure used for the conducting element, additional problems were to be expected in combination with a glass fiber pouch. On the one hand, textile glass fiber materials have a low elasticity per unit area, while thick electrodes lead to a relatively strong material deformation at the edge of the glass fiber pouch. In addition, the risk of damage to thin glass fibers due to sharp edges is particularly high.

In FIG. 5 the edge connection 17 can be seen in cross section. It is preferably produced by means of a thermoplastic polymer 35, which is applied to the glass fiber textile material of the sheath 13 and heated up to a molten state. The layers of the glass fiber textile material are thereby pressed together at the edge and cooled down so that the thermoplastic polymer solidifies. Examples of thermoplastic polymers are PTFE (polytetrafluoroethylene), PCTFE (polychlorotrifluoroethylene), THV (terpolymers of tetrafluoroethylene, hexafluoropropylene and vinylidene fluoride) or PFA (perfluoroalkoxy polymers). In this example, the edge curvature of both sides of the sheath is the same. Embodiments are also possible in which the edge curvatures are different, or even such that one side is planar and only the other side is curved.

With regard to the ratio of the thicknesses of the glass fiber material of the sheath 13 (thickness D) and the electrode 11 (thickness d), FIG. 5 is not to scale. Preferred values of the thicknesses d and D have already been given.

In spite of the problems to be expected for the person skilled in the art in the processing of glass fiber textile materials in an inorganic electrolyte solution, in the context of the invention a method for producing a battery cell has been successfully developed. An essential aspect of the development was achieving the maximum possible degree of automation in the production of the sheath 13 of the electrodes, in particular of the positive electrode. Producing the edge connection 17 of the sheath from glass fiber textile material was found to be crucial and the aspect in which the greatest problems had to be overcome.

The edge connection is produced according to the invention by applying a suitable polymer onto the glass fiber textile material. The layers 15, 16 of the glass fiber textile material are pressed together at the edge, so that the glass fiber material is bonded. The polymer is applied at least onto the edge of one of the layers 15, 16 to be joined. A suitable polymer is THV.

An edge strip, which is preferably no wider than 5% as a proportion of the corresponding dimensions in areal direction (width) of the layer of the glass fiber textile material, is covered with the polymer. Particularly preferably the edge is no wider than 3%, highly preferably no wider than 2% of the dimension in the areal direction of the layer.

A preferred method for producing the edge connection uses a thermoplastic polymer, which is applied and heated into a molten state. In another step the two layers of the glass fiber pouch to be joined are compressed at the edge, i.e. in the areas that are covered with the polymer. The compressed layers are cooled down such that the polymer solidifies. In this manner, a reliable connection is produced between the two layers. The threads from the two layers of the glass fiber textile material are thus connected together.

Some of the steps of the preferred production method can, of course, also be carried out in a different order. In particular, the steps comprising the application of the polymer material and the heating into a molten state, can take place in a different order. For example, it is possible to apply molten thermoplastic polymer to the edge region of the layers of the glass fiber textile material. The application of the thermoplastic polymer is preferably carried out by extrusion.

In a further preferred embodiment the thermoplastic polymer can also be applied in the form of a thin strip, for example, a strip-like film. In this case, the two layers at the edge are compressed and then heated together with the polymer film, until the polymer reaches a molten state.

In a particular embodiment, the heating of the polymer into the molten state is assisted by simultaneous exposure to an additional heat source on the edge of the glass fiber textile material. For example, the assistance can be provided by ultrasound or infrared radiation. A simultaneous exposure to ultrasound and heat transfer is preferably effected by a machine part, which contacts the edge of at least one of the glass fiber layers. In the context of the invention it was found that, in particular, the use of a heated sonotrode (ultrasonic horn) is suitable for assisting the heating of the polymer into the molten state, which leads to shorter melting times and therefore accelerates the execution of the method. This can increase the batch sizes obtained in automated production.

In the context of the invention, a further means of producing the edge connection was investigated. In another preferred variant of the method a suitable polymer is dissolved in a solvent. The solution is applied preferably onto one of the layers of the glass fiber textile material. After the second layer has been placed on top, both layers are compressed together. The solvent evaporates, for example at room temperature. Heating the edge up to a temperature adapted for the solvent accelerates the evaporation. Only the polymer therefore remains for connecting the edges, which thus provides the edge connection. When applying the dissolved polymer, no polymer should be allowed to completely penetrate and escape from the glass fiber textile material. A reliable, stable, and durable edge connection is thus obtained.

In the overall process of the method for producing a battery cell, the positive electrodes are sheathed first of all. In producing the sheath, a layer of glass fiber textile material can be first spread out, onto which the positive electrode 10 is placed. The polymer is applied to the edges of the layer to be connected together. This is followed by the addition of the second layer and compression of the two layers at the edge.

Alternatively, the two layers can also be first placed on top of one another and then the glass fiber pouch produced. The positive electrode can then be inserted into the glass fiber pouch which is open on at least one side.

The sheathed positive electrodes are stacked alternately with negative electrodes. The arrangement is such that the electrode stack comprises a negative electrode both at the start and at the end. In a further method step, the electrode stack is enveloped by a stack sheath. The entire enveloped electrode stack is then inserted into the battery cell housing and electrically connected in a further step. After the housing is closed the housing is filled with the electrolyte through the filling port, which is then closed off so that a gas-tight sealed cell is obtained.

The invention claimed is:

1. Rechargeable electrochemical battery cell, comprising:
a housing;
a positive electrode;
a negative electrode;
an electrolyte which contains $SO_2$ and a conducting salt of an active metal of the cell;
a sheath made of a glass fiber textile material enveloping one of the positive and the negative electrodes, the other one of the positive and negative electrode not being enveloped, the areal extent of the sheath being greater than the areal extent of the enveloped electrode, whereby the glass fiber textile material extends beyond the limit of the enveloped electrode;
the glass fiber textile material comprising a first layer covering a first side of the enveloped electrode and a second layer covering a second side of the enveloped electrode; and
an edge connection which connects the first and second layers to each other at an edge of the enveloped electrode;
wherein the length or width of the sheath is the same as a corresponding length or width of the unenveloped electrode; and
wherein the sheath has a thickness of greater than 100 µm and less than 300 µm.

2. Battery cell according to claim 1, wherein the electrode surrounded by the sheath is a positive electrode of the cell.

3. Battery Cell according to claim 1, wherein the positive electrode contains an active material of the composition $Li_x M'_y M''_z (XO_4)_a F_b$, wherein:
M' is at least one metal selected from the group consisting of the elements Ti, V, Cr, Mn, Fe, Co, Ni, Cu and Zn;
M" is at least one metal selected from the group consisting of the metals of groups 2, 3, 4, 5, 6, 8, 9, 10, 11, 12, 13, 14, 15 and 16 of the periodic table;
X is selected from the group consisting of the elements P, Si and S;
x is greater than 0;
y is greater than 0;
z is greater than or equal to 0;
a is greater than 0; and
b is greater than or equal to 0.

4. Battery cell according to claim 1, wherein the thickness (d) of the positive electrode is at least 0.25 mm.

5. Battery cell according to claim 1, wherein the glass fiber textile material is a woven fabric.

6. Battery cell according to claim 5, wherein the thread density of the woven fabric in each direction of the fabric is at least 5 threads/cm.

7. Battery cell according to claim 1, wherein the enveloped electrode comprises a conducting element with a three-dimensional porous metal structure, wherein the porous metal structure extends substantially over the entire thickness (d) of the electrode and the active material is essentially homogeneously distributed in the porous metal structure.

8. Battery cell according to claim 1, wherein the positive electrode comprises multiple positive electrodes, the negative electrode comprises multiple negative electrodes and the sheath comprises multiple sheaths, wherein all electrodes of the cell with a first polarity are each enveloped by one of the sheaths and are arranged in the cell alternately with electrodes of the other polarity in an electrode stack, wherein the number of electrodes with the other polarity is greater by one than the number of enveloped electrodes, and wherein the electrodes with a first polarity are the positive electrodes.

9. Battery cell according to claim 8, wherein the electrode stack formed from the electrodes of both polarities is surrounded by a stack sheath made of a glass fiber textile material or made of a polymer film, wherein the housing of the battery cell is composed of an electrically conducting material and the stack sheath forms an electrical insulation against the housing.

10. Battery cell according to claim 8, wherein the areal extent of the sheath of the electrodes with the first polarity corresponds to the areal extent of the electrodes of the other polarity.

11. Battery cell according to claim 1, wherein the edge connection is produced from a thermoplastic polymer.

12. Battery cell according to claim 1, wherein the electrolyte is based on $SO_2$ and the electrolyte contains at least 1.5 mol $SO_2$ per mol conducting salt.

13. Battery cell according to claim 1, wherein the glass fiber textile material is coated with a coating comprising a polymer.

14. Method for producing a battery cell according to claim 1, wherein to produce the edge connection a polymer is applied to the glass fiber textile material, wherein the layers of the glass fiber textile material are pressed together at the edge so that the glass fiber textile material is bonded by the polymer.

15. Method according to claim 14, wherein the polymer is a thermoplastic polymer, which is heated into a molten state, the layers of the glass fiber textile material being cooled at the edge such that the thermoplastic polymer solidifies.

16. Method according to claim 15, wherein the heating into the molten state is effected by simultaneous exposure to ultrasound and heat transfer from a machine part contacting the edge.

17. Method according to claim 15, wherein the thermoplastic polymer is applied by extrusion, wherein the polymer is fed in particle form to an extrusion nozzle and heated therein into the molten state immediately before the application.

18. Method according to claim 15, wherein thermoplastic polymer is applied to the glass fiber textile material as a film-like strip.

19. Method according to claim 14, wherein the polymer is dissolved in a solvent and is applied in dissolved form to the glass fiber textile material.

20. The battery cell of claim 1, wherein the edge connection extends substantially continuously along at least three edges of the enveloped electrodes.

21. The battery cell of claim 20, wherein the edge connection extends along the four edges of the enveloped electrodes.

22. The battery cell of claim 1, wherein the first and second layers are separate and are bound together at the edge connection with a fluoropolymer.

23. The battery cell of claim 1, wherein threads from the glass fiber material of the first and second layers are bound together at the edge connection.

24. The battery cell of claim 23, wherein the bond includes a polymer.

25. The battery cell of claim 1, wherein the first and second layers are pressed together at the edge connection.

26. The battery cell of claim 1, wherein the electrolyte has at least 2 moles of $SO_2$ per mole of conducting salt.

27. Rechargeable electrochemical battery cell, comprising:

a housing;
a plurality of positive electrodes;
a plurality of negative electrodes;
an electrolyte which contains $SO_2$ and a conducting salt of an active metal of the cell;
a plurality of sheaths made of a glass fiber textile material and having a thickness of greater than 100 μm and less than 300 μm, a respective one of the sheaths enveloping each positive electrode or each negative electrode, whereby all of the electrodes of one polarity are enveloped by a respective one of the sheaths and all electrodes of the other polarity are unenveloped, wherein the areal extent of each sheath is greater than the areal extent of the respective enveloped electrode, wherein the number of unenveloped electrodes is greater by one than the number of enveloped electrodes, and wherein the length or width of the unenveloped electrodes is larger than a corresponding length or width of the enveloped electrodes;
each sheath comprising a first layer covering a first side of the respective enveloped electrode and a second layer covering a second side of the respective enveloped electrode; and
each sheath having an edge connection which connects the first and second layers to each other at an edge of the respective enveloped electrode.

28. The rechargeable electrochemical battery cell of claim 27, wherein the enveloped electrodes are the positive electrodes.

29. The battery cell of claim 27, wherein the areal extent of the sheaths is the same as the areal extent of the unenveloped electrodes.

30. The battery cell of claim 27, wherein the edge connection extends substantially continuously along at least three edges of the enveloped electrodes.

31. The battery cell of claim 30, wherein the edge connection extends along the four edges of the enveloped electrodes.

32. The battery cell of claim 27, wherein the first and second layers are separate and are bound together at the edge connection with a thermoplastic polymer.

33. The battery cell of claim 27, wherein threads from the glass fiber material of the first and second layers are bound together at the edge connection.

34. The battery cell of claim 33, wherein the bond includes a polymer.

35. The battery cell of claim 27, wherein the first and second layers are pressed together at the edge connection.

36. Rechargeable electrochemical battery cell, comprising:
a housing;
a positive electrode;
a negative electrode;
an electrolyte which contains $SO_2$ and a conducting salt of an active metal of the cell;
a sheath made of a glass fiber textile material enveloping one of the positive and the negative electrodes, the areal extent of the sheath being greater than the areal extent of the enveloped electrode, wherein the sheath has a thickness of greater than 100 μm and less than 300 μm;
the sheath having a first surface facing a first side of the enveloped electrode and a second surface facing a second side of the enveloped electrode; and
the sheath having an edge connection which extends beyond and around the four edges of the enveloped electrode, wherein the first surface faces and is connected to the second surface at the edge connection.

37. The battery cell of claim 36, wherein only one of the positive and the negative electrodes is enveloped with the glass fiber textile material, the other one of the positive and the negative electrodes being unenveloped.

38. The battery cell of claim 37, wherein the unenveloped electrode has a greater areal extent than the enveloped electrode.

39. The battery cell of claim 36, wherein the edge connection is substantially continuous except for an interruption configured to allow passage of one or more terminal wires.

40. The battery cell of claim 36, wherein the positive electrode has a larger areal extent than the negative electrode, or vice versa.

41. The battery cell of claim 36, wherein the sheath is formed of two separate layers having edges that are bound together at the edge connection.

42. The battery cell of claim 36, wherein threads from the glass fiber material of the first and second surfaces are bound together at the edge connection.

43. The battery cell of claim 42, wherein the bond includes a polymer.

44. The battery cell of claim 36, wherein the first and second surfaces are pressed and adhered together at the edge connection.

45. The battery cell of claim 36, wherein the edge connection has a substantially uniform thickness around the perimeter of the electrode, except for an interruption configured to allow passage of one or more terminal wires.

46. The battery cell of claim 36, wherein the edges of the sheath contact one another at the edge connection.

47. The battery cell of claim 36, wherein the first and second surfaces contact one another in a region extending from the edges of the sheath toward the edges of the enveloped electrode.

48. The battery cell of claim 47, wherein the contact of the first and second surfaces in the region comprises the first and second surfaces being bound to one another.

* * * * *

UNITED STATES PATENT AND TRADEMARK OFFICE
CERTIFICATE OF CORRECTION

PATENT NO. : 10,522,807 B2
APPLICATION NO. : 14/238108
DATED : December 31, 2019
INVENTOR(S) : Markus Borck and Laurent Zinck Page 1 of 1

It is certified that error appears in the above-identified patent and that said Letters Patent is hereby corrected as shown below:

On the Title Page

The Assignee Name at (73) should read --Innolith Assets AG--.

Signed and Sealed this
Eighteenth Day of February, 2020

Andrei Iancu
*Director of the United States Patent and Trademark Office*